April 7, 1936.  S. B. MacFARLANE ET AL  2,036,288
GYROSCOPE SEXTANT
Filed July 17, 1934   5 Sheets-Sheet 3

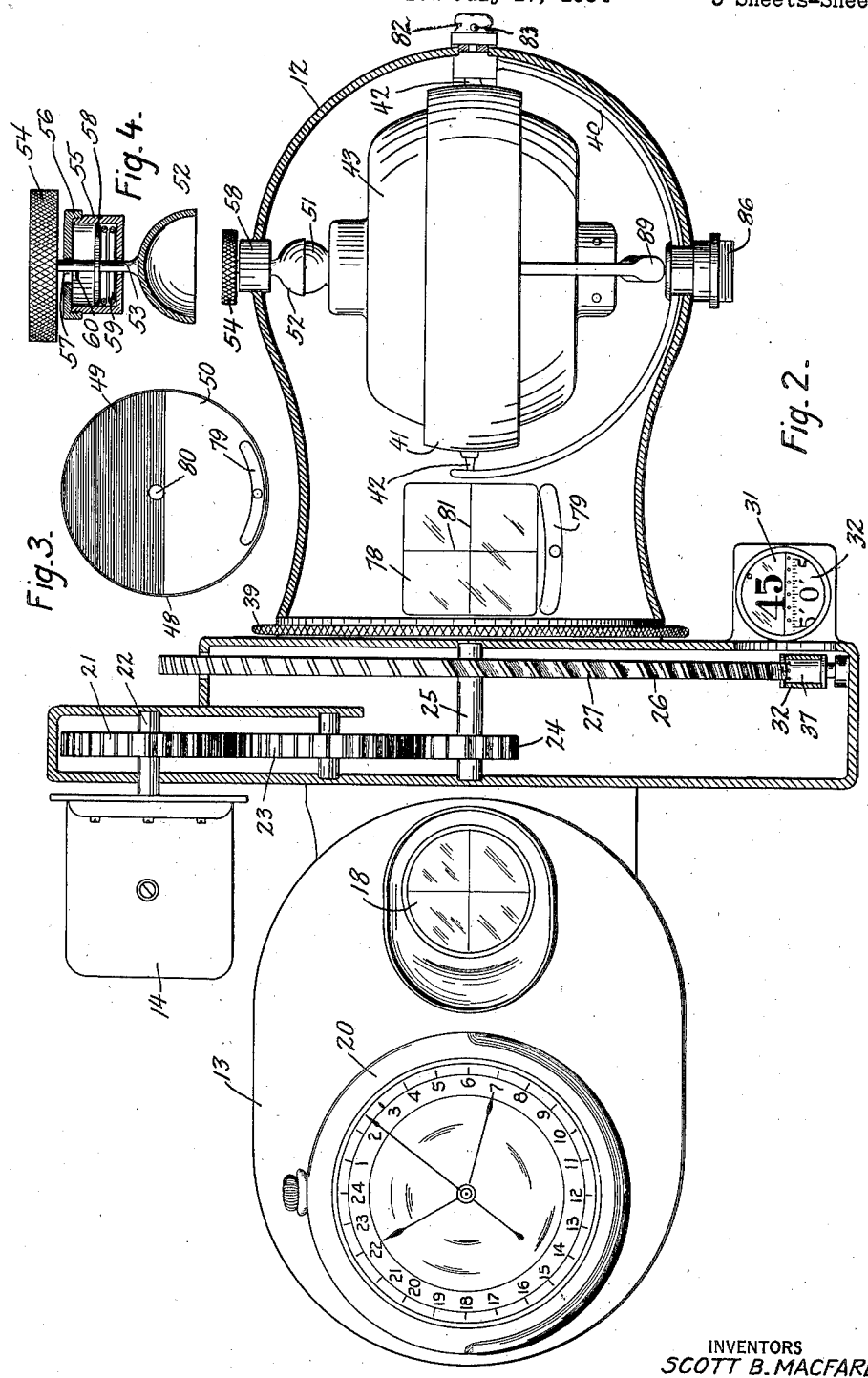

INVENTORS
SCOTT B. MACFARLANE
BY ROBERT E. JASPERSON
Harold Dodd
ATTORNEY

April 7, 1936.  S. B. MacFARLANE ET AL  2,036,288
GYROSCOPE SEXTANT
Filed July 17, 1934   5 Sheets-Sheet 4
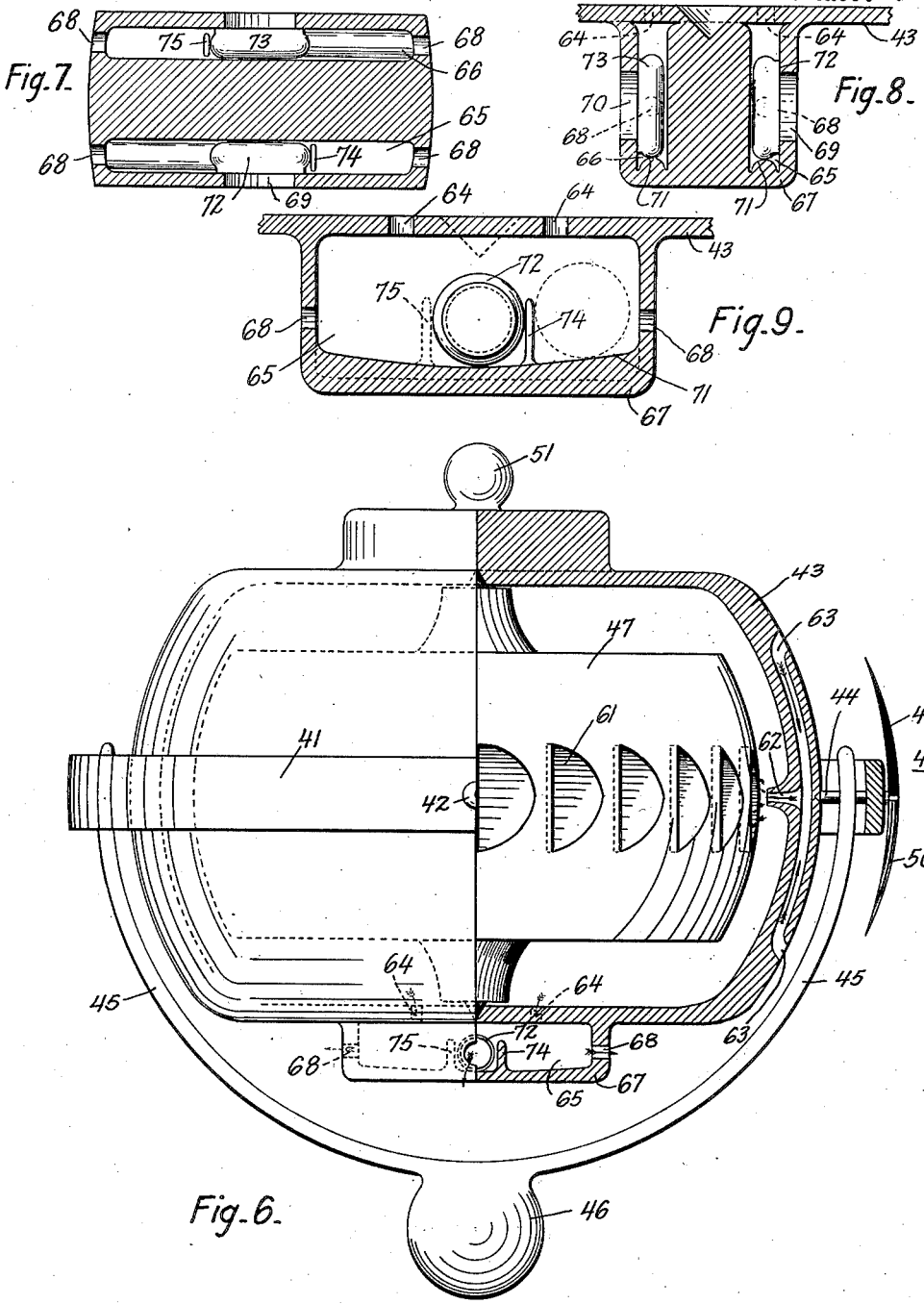
INVENTORS
SCOTT B. MACFARLANE
ROBERT E. JASPERSON
BY
Harold Dodd.
ATTORNEY Patented Apr. 7, 1936

2,036,288

UNITED STATES PATENT OFFICE 2,036,288

GYROSCOPE SEXTANT

Scott B. MacFarlane and Robert E. Jasperson,
United States Navy

Application July 17, 1934, Serial No. 735,716

12 Claims. (Cl. 88—2.7)

(Granted under the act of March 3, 1883, as amended April 30, 1928; 370 O. G. 757)

This invention relates to a sextant having incorporated therein a gyroscope to maintain an artificial horizon and means to counteract the effects of sustained accelerations on the position of such artificial horizon.

Among the objects of this invention are:

To provide an instrument of the type above mentioned having a fluid driven gyro and means for utilizing the exhaust fluid to offset the effects of prolonged accelerations;

To provide a sextant having a novel means for indicating fractions of degrees;

To improve generally, and specifically to make more accurate, instruments of this type.

In the drawings:

Fig. 2 is a rear end elevation with parts cut away to show the operating mechanism;

Fig. 3 is a detail view of the artificial horizon disk;

Fig. 4 is a detail view of the gyro locking mechanism;

Fig. 6 is an elevational view of the gyroscope with one-fourth the housing removed to show the rotor and the means for driving the same;

Figure 10:
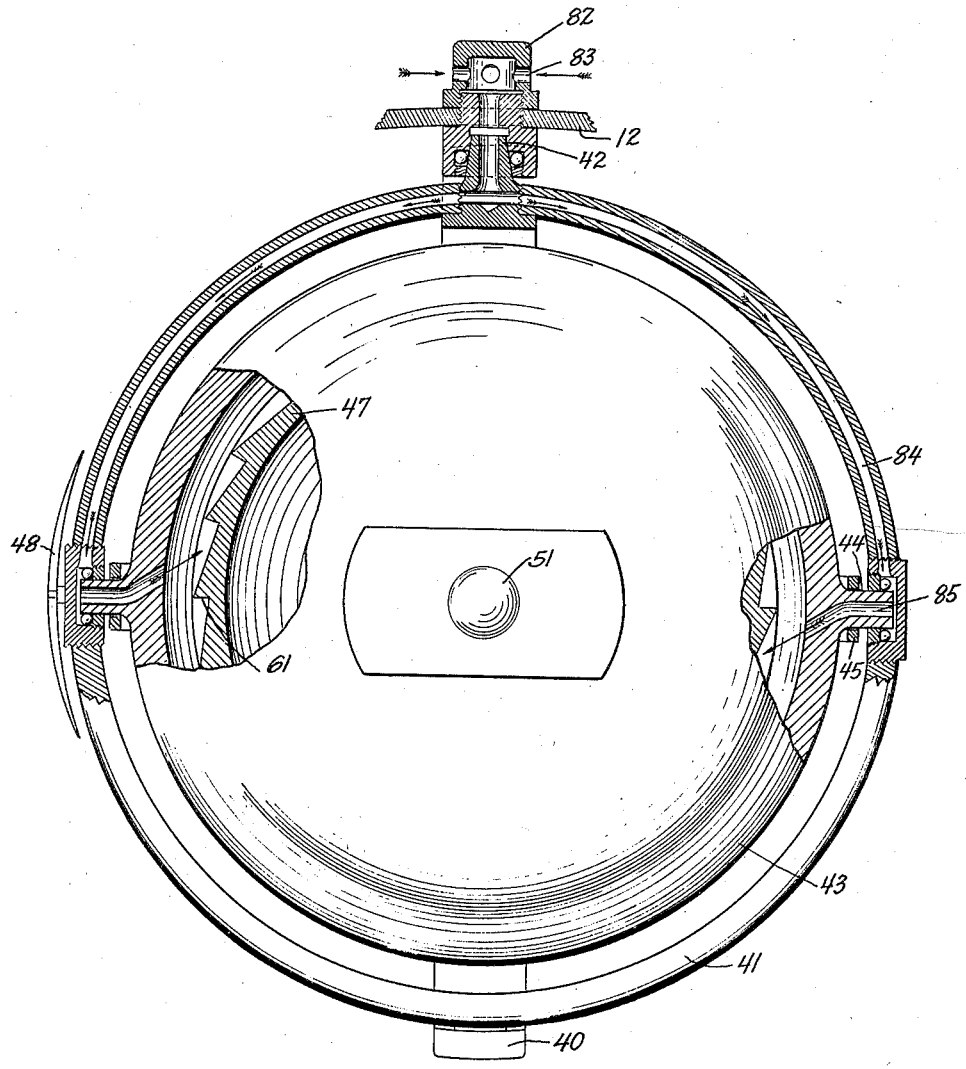

Figs. 7, 8, and 9 are respectively a top plan view, a transverse sectional view and a longitudinal sectional view of the novel means for utilizing exhaust fluid to exert a precessing torque on the gyro;

Fig. 10 is a top plan view of the gyro with parts in section to illustrate one means for supplying fluid to drive the gyro rotor.

The present invention has many points of similarity with, and is designed as an improvement of, the sextant disclosed in our Patent No. 1,964,737, 3 July, 1934.

The present invention may conveniently be considered as consisting of two sub-assemblies which cooperate in obtaining the desired results. The one sub-assembly, enclosed in the right-hand casing member 12, consists of the means for providing an artificial horizon and the other sub-assembly enclosed in the left-hand casing member 13 consists of means for obtaining the angle of elevation of a heavenly body with reference to the horizon, which may be either the natural horizon or the artificial horizon provided in the first mentioned sub-assembly.

Index glass 14 is rotatably mounted on a portion of casing member 13 and is disposed to reflect light to horizon glass 15 which has a transmitting portion 16 and a reflecting portion 17 so placed as to be visible from eye-piece 18. As is customary, filters 19 are mounted to be swingable in front of transmitting portion 16 of horizon glass 15 to cut out excessive light. A chronometer 20 is mounted on the rear end of casing member 13 to be easily read at the time of taking an observation.

A gear wheel 21 is fixed on shaft 22 upon which index glass 14 is mounted, the said gear being meshed with a gear 23 which in turn engages a gear 24 on shaft 25. Fixed on shaft 25 is a disk 26 having gear teeth 27 on the periphery thereof engaged with a pinion 28 carried by a shaft 29. The outer face of disk 26 has on it a circular scale 30 calibrated into ninety equal parts for the complete perigon, the ratio of the gears 24, 23 and 21 being such that disk 26 makes a complete rotation while index glass 14 is being tilted through the angle necessary to change the sight through eyepiece 18 from the horizon to a body having an angular altitude of 90 degrees. The numerals of scale 30 are reversed so they will appear with the proper orientation when viewed by means of a reflecting prism 31. An endless member 32 is disposed to lie adjacent the disk 26 at the point visible at 31, whereby the calibrations 33 on the endless member may be read in conjunction with the numerals of the scale 30 on disk 26. Endless member 32 passes around a roll 34 fixed on shaft 29 and provided with driving lugs 35 that engage perforations 36 in the endless member to drive the said member positively without slippage, the idler roll 37 forming the other support for member 32. The calibrations 33 on endless member 32 are in a plurality of series, preferably running from zero to 60 in each series, the diameter of driving roll 34 and the ratio of pinion 28 to the peripheral teeth on disk 26 being such that a complete series of the calibrations on endless member 32 is moved past the point of reading while the disk 26 is being rotated from one calibration to the next, and thereby the sub-divisions of the calibrations on member 32 are made to indicate the number of minutes in excess of a whole number of degrees of elevation of a heavenly body corresponding to a given rotational position of disk 26. A knurled head 38 is provided for rotating shaft 29 and thereby actuating disk 26 and endless member 32.

Right-hand casing member 12 is detachably secured to left-hand member 13 by means of a connection 39 of the well known union type. In said member 12 is fixed a semi-circular supporting element 40 in which is mounted gimbal ring 41 that is free to rotate about its gudgeons 42. The gyro housing 43 is carried by trunnions 44 at right angles to the axis of rotation of gimbal ring 41, and on these trunnions the arms 45 that support pendulum 46 are swingably mounted. The spin axis of the gyro rotor 47 is at right angles to the axis of support of both the gyro housing and the gimbal ring and lies normally in a vertical position. Pendulum 46 and the gyro are slightly pendulous about gimbal ring gudgeons 42.

Artificial horizon disk 48 has a light absorbing portion 49 and a light reflecting portion 50 the boundary between the two lying on the normally horizontal diameter of the disk, the said disk being mounted on gimbal ring 41 with its center in alignment with trunnion 44. The upper portion of gyro housing 43 carries a ball 51 that is engageable by a hemispherical cup 52 fixed to a stem 53 to which is secured the knurled head 54. The stem 53 passes through a cylinder 55 that is secured to casing member 12 and has at its outer end a cap 56 wherein is a slot 57. A collar 58 is fixed on stem 53 and a spring 59 is disposed between this collar and the bottom of cylinder 55 to lift the cup 52 away from ball 51, which unlocks the gyro and leaves it free to tilt in any direction. The cup 52 is held in locking engagement with ball 51 by means of a pin 60 fixed to stem 53 which may be rotated to pass through a slot 57 when the gyro is to be unlocked but may be turned away from the slot against the inner face of cap 56 to lock the gyro.

Gyro rotor 47 has in its periphery a series of cups 61 against which the stream of fluid for driving the rotor is directed by a nozzle 62, the fluid being conveyed to the nozzle through passages 63 in the gyro housing. While the fluid, preferably air, may be introduced by pressure applied at the passages 63, it may be caused to flow at high velocity by connecting the outlet from gyro housing 43 to a suction or vacuum device. However, there are many well known means for causing such flow of fluid and inasmuch as this forms no part of the present invention it is not illustrated in the drawings.

As is shown in Figs. 6 to 9, the exhaust fluid from gyro housing 43 passes through apertures 64 into two parallel, elongated chambers 65 and 66 in a member 67 carried by the lower side of the gyro housing, said chambers lying parallel to the plane in which the pendulum 46 normally hangs. Each of the chambers 65 and 66 has an outlet aperture 68 at each end and a large lateral outlet opening 69 and 70, respectively, through the outer side walls, the last mentioned openings being opposite each other. The bottom of each chamber has formed in it a rib 71 which is upwardly convex transversely and upwardly concave longitudinally, the lowest portion of said rib being opposite the respective openings 69 and 70. A disk valve 72 is disposed on edge in the chamber 65 and a like valve 73 is in chamber 66. It will be observed that when the gyro spin axis is vertical, the down-curve of ribs 71 will cause the disk valves to roll into position opposite the respective lateral outlet openings to close the same. Stop 74 in chamber 65 prevents movement of valve 72 away from the opening in one direction while stop 75 prevents movement of valve 73 away from its opening in the opposite direction, for a purpose which will presently appear.

The horizon simulating disk 48 is mounted on the forward side of gimbal ring 41 and is observed at eyepiece 76 by means of reflecting prisms 77 and 78 which reflect the image of the disk to the eyepiece. An inclinometer 79 consisting of a steel ball surrounded by liquid is disposed adjacent the prism 78 to be viewable simultaneously with the image of disk 48. The appearance thereof and the image of the heavenly body being observed are shown in Fig. 3 wherein numeral 80 designates the apparent position of the image of the heavenly body when the reading is taken. Although the image 80 of the heavenly body is seen with one eye and the image of disk 48 is seen with the other eye, they are perceived and interpreted as being superposed, due to the characteristics of binocular vision. The prism 78 is provided with horizontal and vertical reticle wires or lines 81.

Figs. 2 and 10 illustrate one contemplated system for supplying air to drive the gyro rotor 47. As shown in the latter figure, the gudgeon 42 of gimbal ring 41 is axially bored and communicates at one end with the cap nut 32 having apertures 83 for the admission of air and at its other end with ducts 84 in gimbal ring 41 that communicate with passages 85 in the trunnions 44 of gyro housing 43, the inner portions of the passages 85 being deflected as shown to cause air passing therethrough to impinge against cup 61 at the proper angle. The air is drawn into the openings 83 by applying a suction to the fitting 86, it being of course understood that the casing member 12 is substantially air-tight to prevent entry of air thereinto except through the passages that will cause it to drive the gyro rotor.

Figure 1:
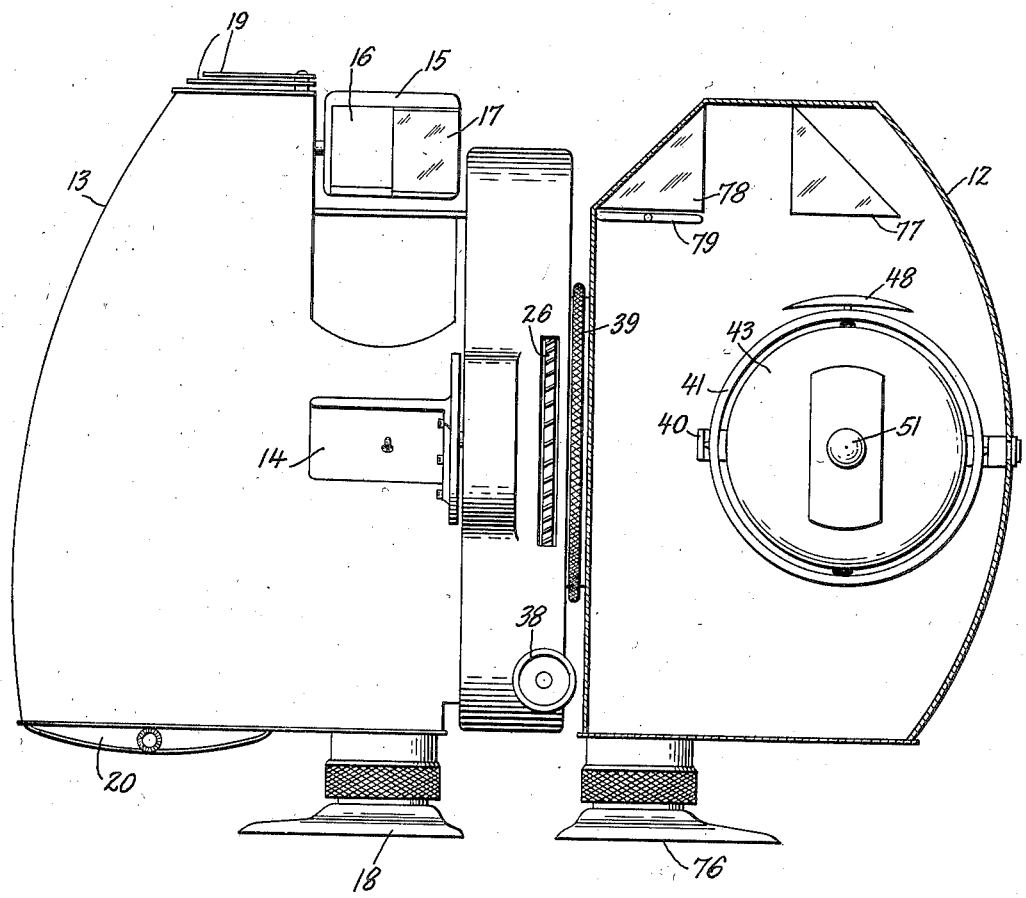
Fig. 1 is a top plan view with the upper side of one portion of the casing removed.
Figure 5:
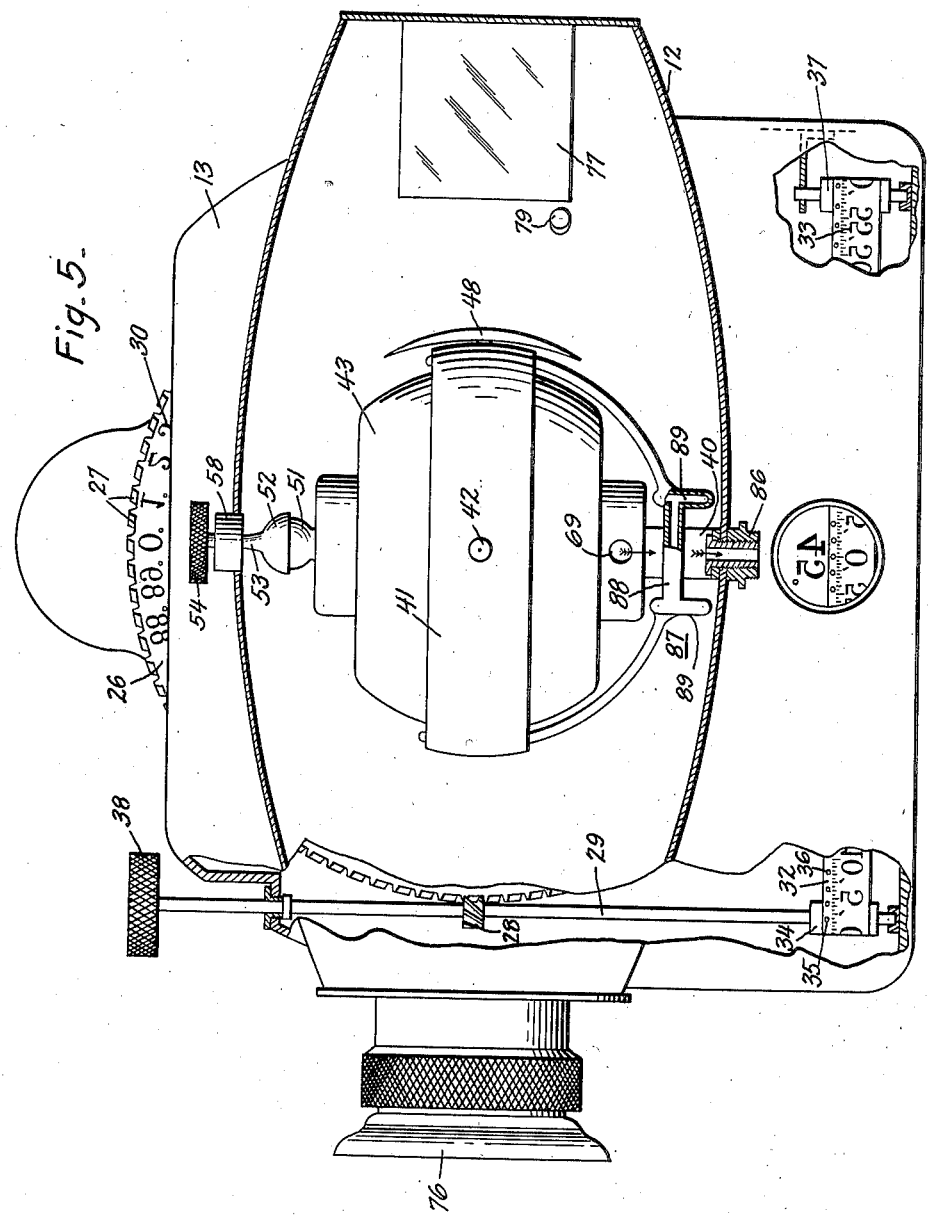
Fig. 5 is a side elevational view, of the right-hand portion of the instrument, with portions cut away to disclose the gyroscope and associated parts.

The pendulum 46, shown in Fig. 6, is solid and is perhaps the better form, but an alternative construction is shown in Figs. 2 and 5, wherein the pendulum consists of a substantially I-shaped hollow member 87 disposed with the web 88 thereof parallel to the axis about which the pendulum is swingable and with the end portions 89 substantially parallel to the spin axis of the gyro. A quantity of mercury is placed inside the member 87 sufficient to fill said member somewhat above the lower side of the cavity in web member 88 and thus the mercury is free to shift from one part of the member 87 to another due to the effect of sustained accelerations, the purpose for permitting the shift being hereinafter set forth in detail.

The theory upon which the operation of our invention is based is as follows:

If a gyro wheel having two degrees of rotational freedom be mounted on a pendulum in such a manner that the gyro axle, the axis of precession and the axis about which the pendulum oscillates are mutually perpendicular to one another, the amplitude of oscillation of the pendulum will be decreased if the gyro axle be acted upon by an outside torque in the same direction as the precession.

If, therefore, the rotor 47 be spinning in a clockwise direction, as seen from above, it is free to move on its trunnions 44 without in any way affecting pendulum 46, but to rotate the gimbal ring 41 on its gudgeons 42 the pendulum must be raised above its normal position of rest and hence exerts a force tending to keep the gimbal ring level. Momentary accelerations in the plane defined by arms 45 and pendulum 46 will not have any appreciable effect owing to the gyroscopic inertia of rotor 47 and the mechanical inertia of pendulum 46, but if a sustained acceleration be applied in that plane, the pendulum will be displaced in a direction opposite the direction toward which the instrument is being accelerated.

Assume, for example, that the accelerating force acts from left to right upon the device as shown in Fig. 6. This will cause the pendulum 46 to be swung to the left but the torque thus exerted upon gyro rotor 47 will cause a precessive movement that will tend to tilt the upper end of the gyro axis toward the observer, i. e., out of the plane of the drawing. However, such acceleration would cause the valve 72 to be rolled away from opening 69 and hence the greater part of the exhaust air would be drawn into chamber 65 and in rushing out through the opening 69 it would exert a jet reaction tending to move the lower end of the gyro axle back into the plane of the drawing. It is readily apparent that a torque so applied to the gyro axle would tend to cause a precessive movement that would turn the spin axis of the gyro in a counter-clockwise direction, as viewed in Fig. 6, and hence would oppose the movement of pendulum 46 by the accelerating force. If the acceleration were from left to right in Fig. 6 the valve 73 would be moved away from opening 70 and the torque applied by the outrushing jet of air would counteract the tendency of pendulum 46 to swing under the influence of that acceleration.

In the case of the mercury filled pendulum 87 an acceleration acting from right to left in Fig. 5 would tend to move the pendulum as a whole toward the right, but the mercury, being mobile, would itself be caused to flow toward the right and thus would bring the center of gravity of the pendulum toward the right-hand side thereof, which would exert a force in opposition to the tendency of the pendulum as a whole to swing to the right and this would be in addition to the effect upon the gyro that it would have merely as a pendulous weight, as above described.

The method of using our present invention is as follows:

With the gyro rotor at rest and the gyro locked, the instrument is directed at the heavenly body being observed. The true and reflected images of the body are brought into coincidence by rotating disk 26 and the index error is noted. The instrument is then lowered to an approximately horizontal position, the reflected image of the body being maintained in the field of view meanwhile by rotating the disk 26.

Keeping the instrument horizontal transversely by maintaining the steel ball of inclinometer 79 in the central position, the starting valve is opened and the gyro is unlocked. The gyro is now free to swing about the athwartship's axis and the dividing line of disk 48 becomes the horizontal reference plane, coincidence being secured by rotating the knurled head 38 until a limb of the heavenly body touches the reference line. The altitude of the body is then read at 31 and the time of the observation is taken from chronometer 20.

The invention described herein may be manufactured and used by or for the Government of the United States of America for governmental purposes without the payment of any royalties thereon or therefor.

We claim:

1. Artificial horizon means, comprising a casing member, a gimbal ring in said member mounted to pivot about an axis transverse to said member, a gyroscope having a rotor and a housing mounted in said gimbal to tilt about a horizontal axis at right angles to the aforesaid horizontal axis, the spin axis of said rotor being vertical and the periphery of said rotor having in it a series of cups, a disk fixed to said gimbal adjacent the forward end of the last mentioned axis, the upper half of said disk having a light absorbing surface and the lower half thereof having a light reflecting surface, a pendulum disposed below said gyro and mounted to be swingable about said last mentioned axis, means to direct a stream of air against said cups, a member carried by the lower portion of said housing having in it two chambers parallel to the last mentioned axis, there being an aperture opening into each of said chambers through which air may pass from said rotor into said chambers, an outlet opening at each end of each of said chambers, and an outlet opening in the outer side wall of each chamber, the bottom of each of said chambers being lowest adjacent the said opening through the lateral wall; a disk valve disposed on edge for rolling movement in each of said chambers, the diameter of said valves being somewhat greater than that of said lateral openings, a stop in each chamber, the said stops being on opposite sides of the respective lateral openings, whereby when the gyro is translationally accelerated in one direction transversely to the axis of the gimbal one lateral opening will be uncovered and the other covered to set up a reactive force by air issuing from the uncovered lateral opening to cause said gyro to exert a torque in opposition to the swing of said pendulum, and means in said member to view said disk.

2. Means to provide an artificial horizon viewable simultaneously with a heavenly body, including a gyroscope having a rotor and housing in which said rotor is mounted with its spin axis vertical, there being a series of cups in the periphery of said rotor, the said housing being mounted to have freedom of tilt in two directions at right angles to each other and to said spin axis, a pendulum disposed beneath said housing to lie normally substantially in the plane of one of said tilt axes and mounted to swing about the said axis, means to direct a jet of air against said cups, a member carried by the lower side of said housing having in it two chambers lying parallel to the said pendulum there being an aperture to admit air to each chamber from said housing, an outlet opening at each end of each chamber and an outlet opening in the outer lateral wall of each chamber, the bottom of each of said chambers being lowest adjacent said lateral openings, a disk valve disposed on edge for rolling movement in each of said chambers, the diameter of said valves being somewhat greater than that of said lateral openings, a stop in each chamber, the said stops being on opposite sides of the respective lateral openings, whereby when the gyro is translationally accelerated parallel to the plane of said pendulum one of said lateral openings will be covered and the other uncovered to set up a reactive force by air issuing from the uncovered lateral opening to cause the gyro to exert a torque in opposition to the swing of said pendulum due to said acceleration, horizon-simulating means mounted to move with said gyro housing, and means to view said last mentioned means.

3. Means for providing an artificial horizon, comprising a gyroscope having a rotor and a housing in which said rotor is mounted with its spin axis vertical, there being a series of cups in the periphery of said rotor, said housing being mounted to have freedom of tilt in two directions at right angles to said axis and to each other, a pendulum disposed beneath said housing to lie normally substantially in the plane of one of said tilt axes and mounted to swing about the said axis, means to direct a jet of air against said cups, a member carried by the lower side of said housing having in it two chambers lying parallel to the said pendulum, there being an aperture to admit air to each chamber from said housing, an outlet opening at each end of each chamber and an outlet opening in the outer lateral wall of each chamber, the bottom of each of said chambers being lowest adjacent said lateral openings, a disk valve disposed on edge for rolling movement in each of said chambers, the diameter of said valves being somewhat greater than that of said lateral openings, a stop in each chamber, the said stops being on opposite sides of the respective lateral openings, whereby when the gyro is translationally accelerated parallel to the plane of said pendulum one of said lateral openings will be covered and the other uncovered to set up a reactive force by air issuing from the uncovered lateral opening to cause the gyro to exert a torque in opposition to the swing of said pendulum due to said acceleration, horizon-simulating means mounted to move with said gyro housing, and means to view said last mentioned means.

4. Means to provide an artificial horizon, including a gyroscope having a rotor and housing in which said rotor is mounted with its spin axis vertical, there being a series of cups in the periphery of said rotor, the said housing being mounted to have freedom of tilt in two directions at right angles to each other and to said spin axis, a pendulum disposed beneath said housing to lie normally substantially in the plane of one of said tilt axes and mounted to swing about the said axis, means to direct a stream of fluid against said cups to drive said rotor, and means operable by a component of translational acceleration of said gyro parallel to the normal plane of said pendulum to utilize fluid issuing from said gyro to apply a torque to said gyro to set up a precessive force in opposition to movement of said pendulum in its own plane, said means including two disc valves disposed to roll on their edges to and from the closed position.

5. Means to provide an artificial horizon, including a gyroscope having a rotor and housing in which said rotor is mounted with its spin axis vertical, there being a series of cups in the periphery of said rotor, the said housing being mounted to have freedom of tilt in two directions at right angles to each other and to said spin axis, a pendulum disposed beneath said housing to lie normally substantially in the plane of one of said tilt axes and mounted to swing about the said axis, means to direct a stream of fluid against said cups to drive said rotor, and means including two valves operable by a component of translational acceleration of said gyro parallel to the normal plane of said pendulum to utilize fluid issuing from said gyro to apply a torque to said gyro to set up a precessive force in opposition to movement of said pendulum in its own plane, said valves being disposed for limited rolling movement, one of said valves being moved to the open position and the other to the closed position by such component.

6. Means for providing an artificial horizon, comprising a gyroscope having a rotor and a housing in which said rotor is mounted with its spin axis vertical, there being a series of cups in the periphery of said rotor, said housing being mounted to have freedom of tilt in two directions at right angles to said axis and to each other, a pendulum disposed beneath said housing to lie normally substantially in the plane of one of said directions of tilt and mounted to swing at right angles to its own plane, means to direct a stream of fluid against said cups to drive said rotor, and means operable by a component of translational acceleration of said gyro parallel to the normal plane of said pendulum to utilize fluid issuing from said gyro to apply a torque to said gyro to set up a precessive force in opposition to movement of said pendulum in its own plane, said means including two disc valves disposed to roll on their edges to and from the closed position.

7. Means for providing an artificial horizon, comprising a gyroscope having a rotor and a housing in which said rotor is mounted with its spin axis vertical, there being a series of cups in the periphery of said rotor, said housing being mounted to have freedom of tilt in two directions at right angles to said axis and to each other, a pendulum disposed beneath said housing to lie normally substantially in the plane of one of said directions of tilt and mounted to swing at right angles to its own plane, means to direct a stream of fluid against said cups to drive said rotor, and means including two valves operable by a component of translational acceleration of said gyro parallel to the normal plane of said pendulum to utilize fluid issuing from said gyro to apply a torque to said gyro to set up a precessive force in opposition to movement of said pendulum in its own plane, said valves being disposed for limited rolling movement, one of said valves being moved to the open position and the other to the closed position by such component.

8. Means for providing an artificial horizon, comprising a gyroscope having a rotor and a housing in which said rotor is mounted with its spin axis vertical, there being a series of cups in the periphery of said rotor, said housing being mounted to have freedom of tilt in two directions at right angles to said axis and to each other, a pendulum disposed beneath said housing to lie normally substantially in the plane of one of said directions of tilt and mounted to swing at right angles to its own plane, a member carried by the lower side of said casing, there being in said member paired chambers having opposite outlet openings, the bottom of each chamber being lowest adjacent the said outlet opening therefrom, and a closure in each chamber disposed to roll on said bottom to close the respective outlet openings, the inertia of such closures causing said closures to move when the gyro is accelerated parallel to the length of said chambers, a stop in each chamber to prevent movement of a closure away from its opening in one direction, the possible respective movement of said closures away from the openings being in opposite directions, whereby, when one of said openings is uncovered, a torque is applied to the gyro and the gyro is caused to oppose movement of said pendulum due to such acceleration.

9. Means for providing an artificial horizon, comprising a gyroscope having a rotor and a housing in which said rotor is mounted with its spin axis vertical, there being a series of cups in the periphery of said rotor, said housing being mounted to have freedom of tilt in two directions at right angles to said axis and to each other, a pendulum disposed beneath said housing to lie normally substantially in the plane of one of said directions of tilt and mounted to swing at right angles to its own plane, means associated with said gyro to control the exhaust of fluid from the gyro including a member having paired chambers with an outlet opening from each chamber, the said openings being opposed and the bottoms of said chambers being lowest adjacent said openings, an acceleration-actuated element disposed in each chamber to roll on said bottom and normally to cover the outlet opening, a stop in each chamber to prevent movement of the element therein away from the opening in one direction, the directions of possible movement of said elements away from the respective openings being opposite, whereby acceleration of the gyro in either direction parallel to the chambers will uncover one opening while keeping the other opening covered, thus applying a torque to said gyro to cause said gyro to oppose movement of said pendulum by said acceleration.

10. In a sextant, a body member, a horizon glass mounted thereon, an index glass rotatably mounted on said member in operative relation to said horizon glass, and means to rotate said index glass including a peripherally toothed rotatable disk having on one face calibrations in units of arc, a pinion meshed with the said peripheral teeth, a shaft upon which said pinion is fixed, means to rotate said shaft, a roll fixed on said shaft, said roll having a circular series of driving lugs, a second roll spaced from the first mentioned roll, and an endless member passing over both said rolls and having perforations engageable with the said driving lugs, said endless member being calibrated in a plurality of series of sub-multiple units of arc, the said rolls being so disposed that the calibrations on said endless member are readable in conjunction with those on said disk, and the driving ratios of said endless member and of said disk being such that a complete series of said sub-multiple calibrations is caused to pass the point of reading while said disk is turned through the angular distance from one calibration thereon to the next adjacent calibration.

11. In a sextant, a body member, a horizon glass mounted thereon, an index glass rotatably mounted on said member in operative relation to said horizon glass, and means to rotate said index glass including a peripherally toothed rotatable disk having on one face a complete perigon calibrated in ninety units of arc, a pinion meshed with the said peripheral teeth, a shaft upon which said pinion is fixed, means to rotate said shaft, a roll fixed on said shaft, said roll having a circular series of driving lugs, a second roll spaced from said first mentioned roll and both rolls being substantially in the plane of said disk, and an endless member passing over both said rolls and having perforations engageable with said driving lugs, said endless member being calibrated in a plurality of series of divisions each of which series represents one of said units of arc, the calibrations on said endless member being readable in conjunction with those on said disk, the driving ratios of said disk and of said endless member being such that one of said series on the endless member passes the point of reading while said disk is rotating through the space of one calibration thereon.

12. In a sextant, a body member, a horizon glass mounted thereon, an index glass rotatably mounted on said member in operative relation to said horizon glass, and means to rotate said index glass and to show the relative angular position thereof including a rotatable disk having on one face a complete perigon calibrated in ninety units of arc, an endless member mounted for movement adjacent said face of the disk and calibrated in a plurality of series of divisions each of which series represents one of said units of arc, the calibrations on said endless member being readable in conjunction with those on said disk, and means for driving said disk and said endless member simultaneously at such relative rates that a complete series on said endless member passes the point of reading while said disk is rotating through the space between two adjacent calibrations thereon.

SCOTT B. MacFARLANE.
ROBERT E. JASPERSON.